SUBSTITUTED NITRILE STABILIZERS

Martin Dexter, White Plains, and Martin Knell, Ossining, N.Y., assignors to Geigy Chemical Corporation, Greenburgh, N.Y., a corporation of Delaware
No Drawing. Filed Nov. 7, 1960, Ser. No. 67,465
9 Claims. (Cl. 260—465)

This invention relates to novel substituted nitriles which are useful as stabilizers for organic material normally subject to oxidative deterioration. The invention also relates to a method of stabilizing said material and stabilized compositions thereof.

It has been found that the novel compounds of the formula:

wherein

X represents aryl, preferably naphthyl, and substituted aryl, especially hydroxyphenyl and alkylhydroxyphenyl, e.g. lower alkylhydroxyphenyl, such as tertiary butylhydroxyphenyl, and R represents a higher alkyl group, i.e. alkyl having at least 6 carbon atoms, preferably having from 6 to 18 carbon atoms, are surprisingly effective stabilizers of organic material normally subject to oxidative deterioration, in particular, mineral oils useful as lubricants.

A particularly preferred class of nitriles of the general Formula I, useful in stabilizing lubricating oils, such as mineral oils and/or synthetic oils, is represented by the formula:

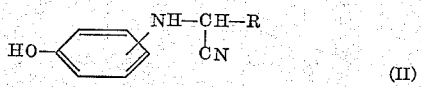

wherein R represents an alkyl group having from 6 to 18 carbon atoms.

Another specific group of compounds useful as stabilizers of lubricants are the nitriles of the formula:

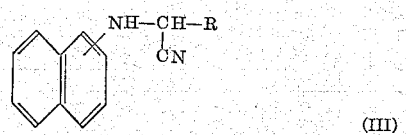

wherein R is defined as above.

It is an object of the present invention that hydrocarbon material, such as e.g. mineral lubricating oil, be stabilized against oxidative deterioration at elevated temperatures with a stabilizing amount of a compound of the general Formula I. A preferred stabilizer of the class having the Formula II is α-(p-hydroxyanilino)-n-octanenitrile.

In particular, it is an object of the invention that hydrocarbon material, e.g. mineral lubricating oil be stabilized against oxidative deterioration with from about 0.001% to about 5% by weight of a stabilizer of the general Formula I, said percent by weight being based upon the total stabilized composition.

The novel stabilizers of the invention are useful in stabilizing many different organic materials normally subject to oxidative deterioration. A preferred material for stabilization is mineral oil, especially mineral oil useful in lubrication. Ordinarily, mineral oil lubricants boil in the range of from about 150° C. to about 350° C. at about 0.01 mm. Hg. The mineral oil lubricants contemplated may be of natural origin or the product of synthesis from other hydrocarbons having a mineral and/or synthetic origin, or they may be mixtures of natural and/or synthetic oils.

Many different natural oils, such as paraffin, naphthenic and mixed base mineral oils having viscosity range, such as from 50 SUS at 37.78° C. to up to 250 SUS at 98.89° C., are within the scope of the invention. Other oils, such as synthetic oils, e.g. polymerized olefins and alkylated aromatics; silicone polymers; esters, e.g. di-isoamyl adipate, and also mixtures of both natural and synthetic lubricants are all contemplated as substrates for stabilizing according to the present invention.

Other stabilizers or additives may also be used in combination with the stabilizers of the present invention, especially in producing stable compositions which are useful as lubricants. Such stabilizers and additives which may be added in addition to the nitrile stabilizers of the invention include antioxidants, corrosion inhibitors, wear inhibitors, blooming agents, pour point depressants or viscosity improvers, anti-foaming agents and the like.

Other organic materials which are advantageously stabilized with the nitrile stabilizers of the invention, include oils of animal or vegetable origin, natural and synthetic rubber, plastic resins, etc., such as polyethylene and polypropylene, polymers of high molecular weight. Other hydrocarbon material, e.g. aryl and aliphatic aldehyde material, is also within the scope of the invention.

The nitrile compounds of the invention are prepared by addition of an appropriate amine to a suitable cyanohydrin. The cyanohydrin in turn is prepared by the addition of hydrogen cyanide to the corresponding aldehyde. The reaction of hydrogen cyanide and the aldehyde, for example, may be performed in the same reaction vessel wherein the amine is reacted to produce the final aminonitrile.

The over-all synthesis may be represented by the following reaction scheme:

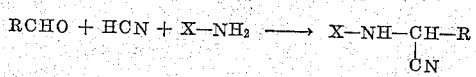

wherein X and R are defined as above.

Besides hydrogen cyanide, any suitable cyanide generating compound may be used. Moreover, any aliphatic aldehyde having at least 7 carbon atoms is also suitable as starting material. Preferred aldehydes include heptaldehyde, octaldehyde, nonaldehyde, decanaldehyde, hendecanaldehyde and dodecanaldehyde.

Preferred amino compounds for reaction with the cyanohydrin compound are the aminophenols, such as p-amino- and substituted-p-aminophenols. Preferably also, alkylaminophenols, e.g. methylaminophenol, dimethylaminophenol, ethylaminophenol, diethylaminophenol, propylaminophenol, dipropylaminophenol, butylaminophenol, dibutylaminophenol, pentylaminophenol, dipentylaminophenol, hexylaminophenol, dihexylaminophenol, etc., are employed.

The following examples are for illustrative purposes and are not meant to limit the invention in any way. In the examples, parts are by weight unless otherwise designated. The relationship between parts by weight and parts by volume is as that of grams to cubic centimeters. The temperatures are in degrees centigrade unless otherwise noted.

EXAMPLE 1

*Preparation of α-(p-Hydroxyanilino)-n-Octanenitrile*

57 parts of n-heptylaldehyde are added to 15.2 parts of hydrogen cyanide (20 parts by volume) and 0.1 part of potassium cyanide at 10° to 15° while stirring constantly. After addition, stirring of the resulting mixture is continued for 2¼ hours at 25°. Thereafter, 54.5 parts of p-aminophenol are added to the reaction mixture, after which 600 parts by volume of ethanol are slurried in, and the whole mixture is heated at reflux for 3 hours, during which time the same becomes homogeneous. After removal of ethanol from the reaction mixture by heating under reduced pressure, the solid residue is washed with water, filtered and dried in vacuo with phosphoric anhydride yielding 128 parts of crude α-(p-hydroxyanilino)-n-octanenitrile. This product is recrystallized after purification with activated charcoal from a mixture of ethyl acetate and hexane (1 part by volume of acetate to 10 parts by volume of hexane). The purified material melts at 84°.

If, in Example 1, 141 parts of n-nonadecanaldehyde are used in place of n-heptaldehyde, then α-(p-hydroxyanilino)-n-eicosanenitrile is obtained.

EXAMPLE 2

*Preparation of α-(p-Hydroxyanilino)- Trimethyloctanenitrile*

78 parts of a mixture of predominantly trimethylheptanaldehydes ("Esso $C_{10}$ Aldehydes") are added to 15.2 parts of hydrogen cyanide (20 parts by volume) and 0.1 part of potassium cyanide at 10° to 15° while stirring constantly. After addition of the aldehyde, the resulting reaction mixture is stirred for 2¼ hours at 25°. Thereafter, 54.5 parts of p-aminophenol are added at 20°, after which 1000 parts by volume of methanol are added to the reaction mixture, and the resulting solution is stirred at 40° for 2 hours, after which the mixture is allowed to stand for about 48 hours at room temperature. Stirring is then continued at 40° for 2½ hours, after which the methanol is removed from the reaction mixture under reduced pressure, leaving a dark viscous oil. The resultant oil is dissolved in 400 parts by volume of ether and the ethereal solution is then washed three times with 500 parts by volume portions of water. The ether extract is separated, purified with activated charcoal, and the purified solution, after filtration, is dried over magnesium sulfate. After removal of the magnesium sulfate by filtration, the ether is removed from the solution on a steam bath, leaving a dark, viscous, oily product, a mixture of predominantly α - (p - hydroxyanilino)-trimethyloctanenitriles, in yield of 96.5 parts. Kjeldahl determination for nitrogen gives 8.4% (10.8% is theoretical).

EXAMPLE 3

*Preparation of α-(p-Hydroxyanilino)-n-Tridecanenitrile*

36.8 parts of n-dodecanaldehyde, 6.0 parts of hydrogen cyanide and 0.4 part of potassium cyanide are mixed at 10°. The temperature is allowed to rise to 25° and is kept at 25–30° for 2½ hours while stirring constantly. Thereafter, 21.8 parts of p-aminophenol in 400 parts by volume of methanol are added over a period of ½ hour with stirring. The reaction mixture is warmed at 40–45° for 6½ hours and then left at room temperature for 3½ days. The so-obtained reaction mixture is then made slightly acid with 5 N hydrochloric acid and flooded with 1000 parts by volume of water. The oil which separates is extracted into ether, the ether removed and the product recrystallized from hexane. The yield of α-(p-hydroxyanilino)-n-tridecanenitrile, melting at 88–91°, is 47.8 parts. After further crystallization from hexane and benzene, the melting point is 91–92°.

EXAMPLE 4

*Preparation of α-(4-Hydroxy-3,5-Di-t-Butylanilino)-n- Octanenitrile*

11.4 parts of n-heptaldehyde, 3.0 parts of hydrogen cyanide and 0.05 part of potassium cyanide are mixed thoroughly and kept at room temperature for 3 hours (initial cooling necessary). Thereafter, 11.05 parts of 4-amino-2,6-di-t-butylphenol in 100 parts by volume of ethanol are added and the whole is refluxed for 3 hours. After standing at room temperature overnight, a small amount of insoluble material is removed by filtration. The alcoholic solution is then diluted with 100 parts by volume of water, and the separated oil is extracted into ether. After drying and removal of the ether, an oil remains which on cooling partially solidifies. The solid is separated by filtration, dried in vacuo and recrystallized from petroleum ether. The yield of α-(4-hydroxy-3,5-di-t-butylanilino)-n-octanenitrile, melting at 69–72°, is 4.38 parts. After further crystallization from petroleum ether, the melting point is 73–74°.

EXAMPLE 5

*Preparation of α-(1-Naphthylamino)-n-Octanenitrile*

57.0 parts of n-heptaldehyde, 16.72 parts of hydrogen cyanide (22 parts by volume as a liquid) and 0.1 part of potassium cyanide are mixed thoroughly and kept at room temperature for 3 hours (initial cooling necessary). Thereafter, 71.6 parts of α-naphthylamine in 200 parts by volume of methanol are added, and the whole mixture is refluxed for 1 hour and then allowed to stand overnight at room temperature. The product, α-(1-naphthylamino)-n-octanenitrile, which crystallizes on standing and cooling, is removed by filtration and air-dried to yield 98.6 parts of product. It melts at 72° after recrystallization from ethanol-water (1035:197 parts by volume) and vacuum drying over phosphoric anhydride.

If, in Example 5, 78 parts of n-decanaldehyde or 92 parts of n-dodecanaldehyde is substituted for 57 parts of heptaldehyde, then there are produced α-(1-naphthylamino)hendecanenitrile and α-(1-naphthylamino)-tridecanenitrile respectively.

EXAMPLE 6

*Stabilized Lubricating Oil Compositions*

A solvent-extracted refined mineral oil having a specific gravity of 31.2 A.P.I. and viscosity 183.6 SUS at 37.78°, 44.9 SUS at 98.89°, is stabilized against oxidative deterioration by the addition of 0.05% by weight of α-(p-hydroxyanilino)-n-octanenitrile.

Similarly, stabilized compositions of mineral oil are obtained when 0.05% by weight of each of the stabilizers in Table I is added to the unstabilized oil:

TABLE I

| Stabilizer | Prepared According to— |
|---|---|
| α-(p-Hydroxyanilino)-trimethyloctanenitrile | Example 2. |
| α-(p-Hydroxyanilino)-n-tridecanenitrile | Example 3. |
| α-(4,Hydroxy-3,5-di-t-butylanilino)-n-octanenitrile | Example 4. |
| α-(1-Naphthylamino)-n-octanenitrile | Example 5. |

What is claimed is:

1. A compound of the formula:

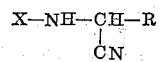

wherein
X is a member selected from the group consisting of naphthyl, hydroxyphenyl and alkylhydroxyphenyl, and
R is a higher alkyl group, having at least 6 carbon atoms.

2. A compound of the formula:

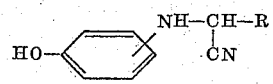

wherein R is an alkyl group having 6 to 18 carbon atoms.

3. A compound of the formula:

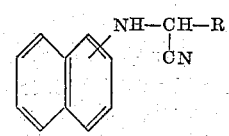

wherein R is an alkyl group having 6 to 18 carbon atoms.

4. A compound of the formula:

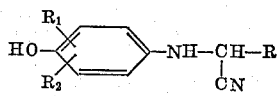

wherein
$R_1$ and $R_2$ are each independently selected from the group consisting of lower alkyl and hydrogen, and R is an alkyl group having 6 to 18 carbon atoms.
5. α-(p-hydroxyanilino)-n-octanenitrile.
6. α-(p-hydroxyanilino)-trimethyloctanenitrile.
7. α-(p-hydroxyanilino)-n-tridecanenitrile.
8. α-(4-hydroxy-3,5-di-t-butylanilino)-n-octanenitrile.
9. α-(1-naphthylamino)-n-octanenitrile.

References Cited in the file of this patent
UNITED STATES PATENTS

| | | |
|---|---|---|
| 778,656 | Graul | Dec. 27, 1904 |
| 2,230,789 | Winter et al. | Feb. 4, 1941 |
| 2,276,162 | Colin | Mar. 10, 1942 |
| 2,454,394 | Lieber et al. | Nov. 23, 1948 |
| 2,497,739 | Pfister | Feb. 14, 1950 |